(12) United States Patent
Leferink et al.

(10) Patent No.: US 9,021,944 B2
(45) Date of Patent: May 5, 2015

(54) TREATMENT DEVICE FOR TREATING FOOD PRODUCTS WITH CONDITIONED AIR

(75) Inventors: Bernardus Wilhelmus Franciscus Leferink, Nijmegen (NL); Hendricus Franciscus Jacobus Maria Van Der Eerden, Gemert (NL); Jeroen Robert Willemsen, Veenendaal (NL); Jacobus Cornelus Maria Baltussen, St. Anthonis (NL)

(73) Assignee: Stork Titan B.V., Boxmeer (NL)

( * ) Notice: Subject to any disclaimer, the term of this patent is extended or adjusted under 35 U.S.C. 154(b) by 1387 days.

(21) Appl. No.: 12/523,871

(22) PCT Filed: Jan. 22, 2008

(86) PCT No.: PCT/NL2008/000026
§ 371 (c)(1),
(2), (4) Date: Jul. 21, 2009

(87) PCT Pub. No.: WO2008/091145
PCT Pub. Date: Jul. 31, 2008

(65) Prior Publication Data
US 2010/0058937 A1    Mar. 11, 2010

(30) Foreign Application Priority Data
Jan. 22, 2007   (NL) ...................................... 1033263

(51) Int. Cl.
*A23B 4/03*    (2006.01)
*F24C 15/32*   (2006.01)
(Continued)

(52) U.S. Cl.
CPC .... *A21B 1/48* (2013.01); *A21B 1/26* (2013.01)

(58) Field of Classification Search
CPC .................................... A21B 1/26; A21B 1/48
USPC ............ 99/476, 443 C, 479, 352–354, 323.1, 99/331, 360–365, 370, 382, 386, 401, 404, 99/410, 420, 447, 474, 477, 485; 126/21 A, 21 R, 1 R, 21 AA, 6, 39 R, 126/15 R, 15 A, 19 R, 20, 19 M, 61
See application file for complete search history.

(56) References Cited

U.S. PATENT DOCUMENTS 1,681,101 A * 8/1928 Coyle ............................ 198/775
4,078,655 A * 3/1978 Roinestad ..................... 198/848
(Continued)

FOREIGN PATENT DOCUMENTS

EP    0 194 036 A1    9/1986
EP    0 953 286 A1    11/1999
(Continued)

*Primary Examiner* — Dana Ross
*Assistant Examiner* — Ket D Dang
(74) *Attorney, Agent, or Firm* — Birch, Stewart, Kolasch & Birch, LLP

(57) ABSTRACT

A treatment device for treating food products with conditioned air comprises a housing which delimits a treatment space and is provided with an entry and an exit, at least one conveying device for conveying the products from the entry throughout the treatment space to the exit, the conveying device between the entry and the exit following a conveying path with several windings which are situated one above the other, air-circulation device for circulating conditioned air throughout the treatment space via a hollow drum. According to a first aspect, air-conditioning device are provided upstream of the air-circulation device for conditioning the air. According to a second aspect, at least one winding of the conveying path near the entry has a pitch which is different to the pitch of the downstream windings.

20 Claims, 3 Drawing Sheets

(51) Int. Cl.
*A21B 1/48* (2006.01)
*A21B 1/26* (2006.01)

(56) References Cited

U.S. PATENT DOCUMENTS

| | | | | |
|---|---|---|---|---|
| 4,356,707 | A | * | 11/1982 | Tyree et al. ............... 62/381 |
| 4,381,442 | A | * | 4/1983 | Guibert .................... 219/400 |
| 4,953,365 | A | * | 9/1990 | Lang et al. ............... 62/381 |
| 5,078,120 | A | * | 1/1992 | Hwang .................... 126/21 A |
| 6,244,168 | B1 | * | 6/2001 | van de Vorst et al. ....... 99/443 C |
| 2002/0031582 | A1 | * | 3/2002 | Perrine .................... 426/467 |

FOREIGN PATENT DOCUMENTS

| | | | |
|---|---|---|---|
| GB | 1090630 A | | 11/1967 |
| JP | 63-127919 A | | 5/1988 |
| JP | 9-310958 A | | 12/1997 |
| WO | WO-91/11660 A1 | | 8/1991 |
| WO | WO-92/20980 A1 | | 11/1992 |
| WO | WO 9221596 A1 | * | 12/1992 ............... A21B 1/02 |
| WO | WO-98/52419 A1 | | 11/1998 |

* cited by examiner

TREATMENT DEVICE FOR TREATING FOOD PRODUCTS WITH CONDITIONED AIR

BACKGROUND OF THE INVENTION

1. Field of the Invention

The present invention relates to a treatment device for treating food products with conditioned air, in particular for mass production.

2. Background of the Invention:

A treatment device for treating food products with conditioned air which can be operated as an oven is known, for example, from European patent application 0 953 286 in the name of the Applicant. This known device comprises a housing in which at least one conveying means is arranged along a helical conveying path for conveying the products through the housing from an entry to an exit. The conveying means comprises a hollow drum composed of substantially horizontal and vertical strips, which hollow drum is rotatably arranged around a vertical shaft. Furthermore, the conveying means comprises an endless conveyor belt which, in use, travels along a helical path. Conditioned air can flow inbetween the strips of the drum over the windings of the conveyor belt. Furthermore, air-conditioning means for conditioning the air stream, for example the temperature and/or moisture content thereof, as well as air-circulation means for circulating the conditioned air throughout the housing are present.

SUMMARY OF THE INVENTION

The ability to create an effective flow of conditioned air is an important aspect with such a treatment device. This applies in particular to treatment situations which aim to achieve uniformity of the atmosphere of conditioned air in the entire treatment space. This is in contrast to situations which are also known in the art where the atmosphere in the treatment space is intentionally changed locally with respect to generally prevailing conditions using additional means, such as additional heating or moisturization, in order to meet certain process requirements. Thus, in such situations, several zones with different treatment conditions are created, which may optionally be separated from one another by means of physical separating means, such as partitions, walls or (air) curtains.

According to a first aspect, it is an object of the invention to provide a treatment device for treating food products with conditioned air, in particular for mass production, in which the conditioned air is circulated throughout the treatment space in an effective manner so that it is in contact with the products to be treated.

It is a further object of the invention to provide such a treatment device having an essentially uniform treatment climate as regards temperature and/or air humidity and/or speed in the entire treatment space, in particular such a treatment device in which no such additional means are required other than primary air-conditioning means and air-circulation means.

It is another object of the invention to provide such a treatment device in which local deviations resulting from the air being conditioned, in the properties of the conditioned air, for example as regards temperature and/or moisture, are reduced.

It is yet another object of the invention to provide such a treatment device which is of compact design.

The treatment device according to the invention comprises a housing having an entry and an exit for introducing the products to be treated and for discharging the treated products, respectively. The housing delimits a treatment space or chamber which is in communication with the entry and exit. Inside the treatment space, a conveying means is provided which travels along a conveying path between the entry and the exit, the conveying path comprising several windings which are situated one above the other and spaced apart. Near this entry and exit, the conveying path comprises conventional straight sections which are relatively short compared to the entire length of the conveying path. The conveying means is designed for supporting the products. The conveying means comprises at least one hollow drum which is rotatably arranged around a vertical rotary shaft and is driven during operation. In the usual way, the conveying means furthermore comprises an endless conveyor belt which is guided around one or more drums along the conveying path comprising a number of windings situated one above the other and which is driven by slip friction with the drum(s). The device according to the invention is also provided with air-conditioning means which regulate the conditions such as temperature and/or humidity of the air which is essentially circulating in the treatment space. Air-circulation means ensure that the air is circulated throughout the treatment space via the hollow drum and via the air-conditioning means. In this manner, conditioned air flows from the circumference of the drum over the windings of the conveying path of the conveying means and over the products conveyed by the latter.

According to the first aspect of the invention, the air-circulation means of the treatment device, viewed in the direction of flow of the conditioned air are arranged downstream of the air-conditioning means. In other words, the inlet side of the air-circulation means, such as the suction side of a ventilator, is either directly or indirectly, but advantageously directly, in fluid communication with the air-conditioning means, and the outlet side of the air-circulation means is either directly or indirectly, in fluid communication with the drum circumference.

Due to the turbulence generated in the air-circulation means, it is possible in this way for the conditioned air, which may have non-uniform conditions as a result of the configuration of the conditioning means, to be mixed downstream of the conditioning means and thus to be homogenized, so that any local deviations resulting from the conditioning of the treatment medium are removed. Thus, the air-circulation means serve a double purpose: on the one hand they serve to circulate the conditioned air and on the other hand they serve to mix and thus homogenize the air conditioned in the air-conditioning means.

The conveying path in the treatment space comprises several windings, which are situated one above the other. Viewed in top view, a winding may have the shape of essentially an ellipse, a polygon, such as a triangle or rectangle, the respective drums being arranged in the end points or corners. A helical conveying path in which the endless conveyor belt is guided around a drum, with a winding essentially following the shape of a circle, is preferred.

In one preferred embodiment, the air-circulation means are at least partially arranged inside the hollow drum. Such an arrangement of the air-circulation means allows a compact design of the total treatment device, since this arrangement results in a space saving compared to known treatment devices in which the air-circulation means are provided at the top of the housing or on the side thereof. Furthermore, due to the central position of the air-circulation means within the conveying path, in particular a helical conveying path, this arrangement makes an efficient circulation of the conditioned air and thus an effective treatment of the products possible. The conditioned air which flows from the air-circulation means is guided and distributed uniformly between the windings of the conveying path via the drum circumference which is permeable to treatment fluid.

Preferably, the air-circulation means comprise a ventilator. Advantageously, the fan thereof is inside the hollow drum, while the drive unit, such as an electric motor, is usually outside the housing. Advantageously, the drive unit is positioned underneath the bottom of the housing. Advantageously, the air-circulation means are at least partially arranged inside the hollow drum at the bottom thereof.

The conveying means preferably comprises a hollow cylindrical drum which is arranged in the oven rotatably about a substantially vertical shaft, as well as a drive means for rotating the drum, and an endless conveyor belt guided around the drum along the conveying path comprising several windings situated one above the other. Advantageously, the drum is composed of essentially horizontal and vertical strips and preferably has a constant diameter. Advantageously, the treatment device is designed in such a way that conditioned air flows only over part of the inner circumference of all the windings of the helical conveying path. This part of the circumference may be, for example, 30-180°. Preferably, this part is less than 90°.

In an embodiment of the treatment device according to the invention, a stationary tubular body is placed between the air-circulation means and the drum and has a vertical outflow aperture which extends at least over the entire height of the windings of the conveying path.

The endless conveyor belt is advanced by the slip friction between the inner edge thereof and the outer circumference of the drum or part thereof. The drive means, such as one or more electric motors, is preferably arranged outside the treatment space, i.e. outside the housing, in particular underneath the bottom thereof. The conveying means is preferably a (metal) gauze belt, which is at least partially permeable to the conditioned treatment fluid.

According to a further preferred embodiment, the rotary shaft of the fan coincides with the rotary shaft of the drum, so that the distance of the fan to the circumference of the drum is constant. According to another preferred embodiment the fan is arranged eccentrically with respect to the vertical rotary shaft of the drum. This is particularly advantageous if it is intended to allow the conditioned air to flow out only over a part of the circumference of the windings of the conveying path.

Air-guiding means for influencing the flow of the conditioned air in a targeted manner may be present in the treatment device according to the invention. Because of the preferred position of the air-circulation means in the hollow drum itself, the conditioned air has to be distributed over a relatively short distance over the drum circumference, in particular over the aperture angle of the outflow aperture of the tubular body and over the height thereof, in order to achieve as uniform as possible an outflow of the conditioned air from the drum circumference, in particular said outflow aperture. Such a distribution of the air over the drum circumference, in particular said entire outflow aperture, contributes to an efficient flow of conditioned air over the products which are situated on the conveying means. Furthermore, this distribution of air is important in order to prevent peaks in the speed of the conditioned air at the positions where the products are located and thus prevent local non-uniform conditions and damage to the product, for example to a coating thereof and/or to prevent non-uniform colouring of the product. Preferably to this end drum air-guiding means are present in the drum at a position downstream of the air-circulation means, preferably in the outflow aperture of the tubular body. Advantageously, the drum air-guiding means are designed in such a manner that, during operation, the conditioned air flows in cocurrent and countercurrent with respect to the direction of movement of the conveyor belt.

The drum air-guiding means in the drum build up a resistance between the air-circulation means and the conveying means, on which the products are situated during treatment. A preferred embodiment of such drum air-guiding means comprises a number of parallel spaced-apart vertically arranged baffle profiles which thus delimit vertical conduits. In (horizontal) cross section, these conduits have a non-linear shape, so that the air flowing out through the conduits is forced to change direction. The distribution of the conditioned air takes place automatically in these conduits. This applies in particular to positions of the conduits where the air already undergoes a change in direction while flowing from the air-circulation means to the conduits. Constricting the inlet end of a conduit is an additional measure to further influence the flow through a conduit. At positions in the conduits where the air coming from the air-circulation means has not undergone a change in direction, the conduits preferably have an S-shaped cross section so that sufficient resistance is built up and local peaks in the air speed (jets) are removed due to the induced change in direction of the conditioned air in these conduits. The width of the outflow side of the vertical conduits is usually greater than the width of the bars of the hollow drum, which rotates during operation, in order to prevent closure of a conduit and the consequences associated therewith which affect the uniform air flow. The direction of the baffle profiles on the outflow side of the vertical conduits substantially determines the distribution over the conveying means, on which the products are situated during operation. An added benefit of such baffle profiles and conduits delimited thereby is the fact that they can easily be cleaned and the risk of blockages is low. Such blockages by dust can occur when a pressure plate is used (a plate provided with relatively small apertures).

As mentioned above, the air-circulation means may be arranged in the centre of the drum. The air-circulation means can also be arranged eccentrically with respect to the rotary shaft of the drum, so that there is a relatively great distance between the air-circulation means and the drum air-guiding means. More preferably, the drum air-guiding means are positioned diametrically opposite the air-circulation means.

If desired, belt air-guiding means may be provided for guiding conditioned air which are arranged in the space above one or more windings of the endless conveyor belt. Such belt air-guiding means, such as inclined baffle profiles or baffle plates, enable further adjustment of the flow direction of the conditioned air flowing over the products situated on the windings and make it possible to achieve a substantially even flow of conditioned air over the width of the conveyor belt. By means of these belt air-guiding means, the conditioned air is directed at the products, thus increasing the transfer of heat between air and products. This allows uniform treatment of the products which are situated both on the inner circumference of a winding and on the outer circumference thereof. Advantageously, these belt air-guiding means are fitted to supporting means for supporting a downstream winding of the helical conveying path.

In an advantageous embodiment, the housing comprises a raisable hood and a tray with a water trap being provided inbetween.

The air-conditioning means are dependent on the type of treatment which is to be carried out in the device according to the invention. In a preferred embodiment of the treatment device according to the invention as an oven, in particular a spiral oven with a helical conveying path, the air-conditioning means comprise at least heating means, such as a heat exchanger (with thermal oil or electrical). Other examples of air-conditioning means comprise moisturizing means for supplying moisture to the circulating air, such as steam-injecting means.

The air-conditioning means are advantageously arranged in a conduit which has a conduit entry which is in communication with the treatment space and a conduit exit which is in communication with the air-circulation means. Preferably, this conduit is provided on the inside of the top of the housing, preferably on the abovementioned hood.

According to a preferred application, the treatment device according to the invention can be used for treating food products with conditioned air, in particular for the partial or complete cooking, baking, frying, grilling of meat and meat products, such as optionally breaded and/or marinated hamburgers, chicken portions and other shaped products. Other applications of the treatment device according to the invention comprise drying, steaming, pasteurizing and sterilizing food products of vegetable and/or animal origin. The food products may optionally be packaged.

Advantageously, the characterizing feature according to the second aspect of the invention to be described below is used in the treatment device according to the first aspect. This feature, in particular the different pitch of the winding near the entry of the housing with respect to the downstream windings, allows good climate control with uniform climate conditions in the entire treatment space. By way of reference, the following part of the description of the second aspect—even without the limitation to an oven specified therein—is incorporated herein.

According to a second aspect, the invention relates to an oven for treating food products with conditioned air, in particular for mass production.

A treatment device for treating food products with conditioned air, which can be operated as an oven, is known, for example, from European patent application 0953286 in the name of the Applicant, as has already been described above. This known device comprises a housing in which at least one conveying means is arranged along a helical conveying path for conveying the products through the housing from an entry to an exit. Furthermore, air-conditioning means for conditioning the air stream, for example the temperature and/or moisture content thereof, as well as air-circulation means for circulating the conditioned air through the housing are present. According to this European patent application, air-distributing means are provided on the inside of the helical conveying path for distributing the air stream via only a part of the inside of the helical conveying path, in such a manner that the conditioned air partially flows over the conveying means in cocurrent and partially in countercurrent.

A problem which may occur with such an oven is the temperature deviation in the atmosphere of conditioned air in the oven space, which temperature deviation or drop at the entry may occur as a result of the introduction of relatively cold, for example frozen or cooled (meat) products having a temperature of 0-4° C. or lower, as well as by the relatively cold conveying means itself. Such a temperature deviation may be undesirable in situations where it is desired to achieve a uniform atmosphere of conditioned air in the entire oven space. Furthermore, it is possible that the products to be treated dry out as a result of heating up taking place too slowly. Extending the required cooking time can also be a disadvantageous consequence. Such an extension is achieved by passing the products through the oven at a slower speed, which results in the capacity, expressed as kg/hour, being reduced.

Incidentally, it should be noted again that there are circumstances known in the field in which the atmosphere in the oven is intentionally changed locally using additional means, such as additional heating, in order to meet certain process requirements. Thus, in such situations, several zones with different treatment conditions are created, which may optionally be separated from one another by means of physical separating means.

It is an object of the present invention to prevent and/or at least reduce said temperature deviation, in most cases a temperature drop, during operation of an oven with an atmosphere of conditioned air which is as uniform as possible, in particular with regard to temperature, moisture and speed.

It is a further object of the invention to prevent drying out of the products to be treated.

It is yet a further object of the invention to prevent the loss of capacity.

The oven according to the invention comprises a housing having an entry and an exit for introducing products to be treated and for discharging the treated products, respectively. The housing delimits an oven space which is in communication with the entry and exit. Inside the oven space, a conveying means is provided which travels along a conveying path between the entry and the exit, the conveying path comprising several windings which are situated one above the other and spaced apart. Near the entry and exit, the conveying path comprises conventional straight sections which are relatively short compared to the entire length of the conveying path. The conveying means is designed for supporting the products. The conveying means comprises at least one hollow drum which is rotatably arranged around a vertical rotary shaft and is driven during operation. In the usual way, the conveying means furthermore comprises an endless conveyor belt which is guided around one or more drums along the conveying path comprising a number of windings situated one above the other and which is driven by slip friction with the drum(s). Air-conditioning means are also provided in the oven, which regulate the conditions, such as temperature and/or moisture, of the air substantially circulating in the oven. Air-circulation means ensure that the air is circulated throughout the oven space via the hollow drum and via the air-conditioning means. In this manner, conditioned air flows from the circumference of the drum over the windings of the conveying path of the conveying means and over the products conveyed by the latter.

With the oven according to the invention, at least one winding of the conveying path near the entry has a pitch which is different to the pitch of downstream windings of the conveying path. In other words, the distance between two successive windings near the entry at points which are perpendicularly above one another differs from the distance between two successive windings which are situated further downstream in the conveying path. As a result thereof, the local influence on the overall oven atmosphere of introducing products to be treated in the oven space and of the conveying means, both having conditions which deviate from the oven conditions, in particular the temperature, can be limited and other measures, which could affect in particular the uniformity of the oven climate, such as the air-circulation speed, may be superfluous. Thus, it is possible to maintain the prevailing oven conditions by locally "adjusting" the product density (number of products/unit volume) at the entry. This results in the products being subjected to a substantially uniform treatment climate of conditioned air over the entire path in the oven space from entry to exit. Also, the risk of the products drying out upon entry is reduced. An additional advantage of the absence of other measures and/or features is the fact that the device according to the invention is easier to clean. Furthermore, the capacity can be maintained at a high level.

Incidentally, it should be noted that WO 92/21596 discloses a conveying means for a baking oven with a so-called double helix, which comprises an upward helical conveying path and a downward helical conveying path. In a schematic drawing of an embodiment thereof, the pitch of the first winding near the entry and of the last winding near the exit seems to differ from the pitch of the other windings. A description thereof is not given.

Incidentally, it should furthermore be noted that WO 92/20980 discloses a combined cryogenic and mechanical freezing device with a single spiral in which the pitch of the helical conveying path is greater in the bottommost cryogenic section than in the other section above it, in order to be able to fit spray heads for the cryogenic fluid.

It should incidentally also be noted that EP 1 437 076 A2 discloses a spiral oven with a double spiral in which a figure of an embodiment shows a different pitch in the second spiral near the exit. According to the description, the pitch is preferably the same throughout.

The conveying path in the treatment space comprises several windings which are situated above one another. When viewed in top view, a winding may essentially have the shape of an ellipse, a polygon, such as a triangle or rectangle, the respective drums being arranged in the end points or corners. A helical conveying path in which the endless conveyor belt is guided around a drum, with a winding essentially following the shape of a circle, is preferred.

Advantageously, the measures according to the first aspect of the invention are also used in an oven according to the second aspect of the invention. What has been described above with respect to the first aspect is therefore incorporated in this part of the description by way of reference.

In one preferred embodiment, the at least one winding near the entry has a pitch which is greater than that of the windings situated downstream thereof. In general, the products introduced have a lower temperature at the entry than the prevailing oven temperature, which could result in a temperature drop at the entry. At a given product density per unit area, a larger volume of conditioned air and thus a larger amount of heat is present as a result of the greater pitch for heating the products introduced compared to the downstream windings with a smaller pitch under otherwise identical conditions.

In one embodiment of the oven according to the invention, the pitch of the windings of the conveying path is preset at a fixed value. In another embodiment of the oven, means for adjusting the pitch of one or more windings are provided. For example, the height of the supporting means over which the conveying means is guided can be adjusted over at least one winding thereof. This feature allows the pitch to be adapted to the products to be treated and to the treatment processes thereof, in particular near the entry of the housing.

Advantageously, the oven according to the invention is provided with belt air-guiding means for guiding conditioned air which are arranged in the space above the at least one winding with different pitch. By these means (such as radially downwardly) inclined baffle profiles or plates, the conditioned air is directed at the products and the transfer of heat between air and products is thus increased.

In a particular embodiment, the belt air-guiding means are fitted to supporting means for supporting a downstream winding of the conveying path.

The conveying means preferably comprises a hollow cylindrical drum which is rotatably arranged in the oven around a substantially vertical shaft, as well as a drive means for rotating the drum, and an endless conveyor belt guided around the drum along the conveying path comprising several windings. The drum preferably has a constant diameter. Advantageously, the oven is designed in such a manner that conditioned air only flows out over a part of the inner circumference of all the windings of the helical conveying path. This part of the circumference may, for example, be 30-180°. Preferably, this part is less than 90°. In one embodiment of the spiral oven according to the invention, a stationary tubular body with a vertical outflow aperture extending at least over the height of the conveying path, is situated between the air-circulating menas and the drum.

The endless conveyor belt is advanced by the slip friction between the inner edge thereof and the outer circumference of the drum. The drive means, such as one or more electric motors, is preferably arranged outside the oven space, i.e. outside the housing, in particular underneath the bottom thereof. The conveying means is preferably a (metal) gauze belt, which is at least partially permeable to the conditioned treatment fluid.

In a further preferred embodiment, the air-circulation means, viewed in the flow direction of the conditioned air, are arranged downstream of the air-conditioning means, as has been explained in detail in the description of the first aspect of the invention. In this preferred embodiment, the inlet side of the air-circulation means, such as the suction side of a ventilator, is in fluid communication with the air-conditioning means, and the outlet side is in fluid communication with the drum. Due to the turbulence generated in the circulation means, it is possible in this way for the conditioned air, which may have non-uniform conditions as a result of the configuration of such conditioning means, to be mixed downstream of the conditioning means and thus to be homogenized, so that local deviations resulting from the conditioning of the treatment medium in the air-conditioning means are removed. Thus, the air-circulation means serve a double purpose: on the one hand they serve to circulate the conditioned air and on the other hand they serve to mix and thus homogenize the air conditioned in the air-conditioning means.

In a preferred embodiment, the fan of a ventilator, is arranged in such a manner that the rotary shaft thereof coincides with the rotary shaft of the drum.

In another preferred embodiment, the fan of a ventilator is arranged eccentrically with respect to the vertical rotary shaft of the drum. This is particularly advantageous if it is intended to allow the conditioned air to flow out only over a part of the circumference of the windings of the helical conveying path.

Air-guiding means for influencing the flow of the conditioned air in a targeted manner may be present in the treatment device according to the invention, in particular for distributing the conditioned air from the air-circulation means to the outflow aperture of the tubular body with a limited angle of aperture. Such a distribution of the air over the drum circumference, in particular over the entire outflow aperture, contributes to an efficient flow of conditioned air over the products which are situated on the conveying means. Preferably, therefore, drum air-guiding means are provided in the drum at a position downstream of the air-circulation means, preferably in the outflow aperture of the tubular body. Advantageously, the drum air-guiding means are designed in such a manner that, during operation, the conditioned air flows in cocurrent and countercurrent with respect to the direction of movement of the conveyor belt. A preferred embodiment of drum air-guiding means comprises a number of parallel spaced-apart vertically arranged baffle profiles, which delimit vertical conduits. Another example of air-guiding means is a plate provided with holes, such as a screen plate. Thus, the conditioned air can be distributed over all the windings, even over the height of the conveying path.

In one advantageous embodiment, the housing of the oven comprises a raisable hood and a tray, with a seal such as a water trap being provided inbetween. The air-circulation means are preferably attached to the hood.

The air-conditioning means, such as heating means, for example a heat exchanger (thermal oil or electrical) and/or moisturizing means for supplying moisture to the circulating air, such as steam-injecting means, are advantageously arranged in a conduit which has a conduit entry which is in fluid communication with the oven space and a conduit exit which is in fluid communication with the air-circulation means. Preferably, this conduit is provided on the inside of the top side of the housing, more preferably on the abovementioned hood.

In a preferred embodiment, the air-conditioning means comprise at least one or more heating means.

The oven according to this aspect of the invention can be used for treating food products with conditioned air, in particular the partial or complete cooking, baking, frying, grilling of meat and meat products, such as optionally breaded and/or marinated hamburgers, chicken portions and other shaped products.

BRIEF DESCRIPTION OF THE DRAWINGS

The invention will be explained below with reference to the attached drawing, in which.

DETAILED DESCRIPTION OF THE PREFERRED EMBODIMENTS

Figure 1:
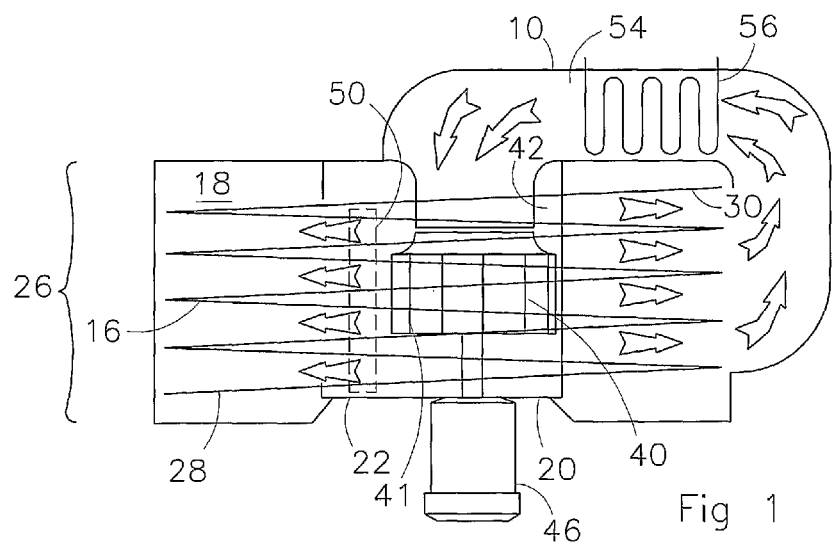
FIG. 1 shows a diagrammatic view in partial cross section of a preferred embodiment of a treatment device in the form of a spiral oven according to the first aspect of the invention.
Figure 2:
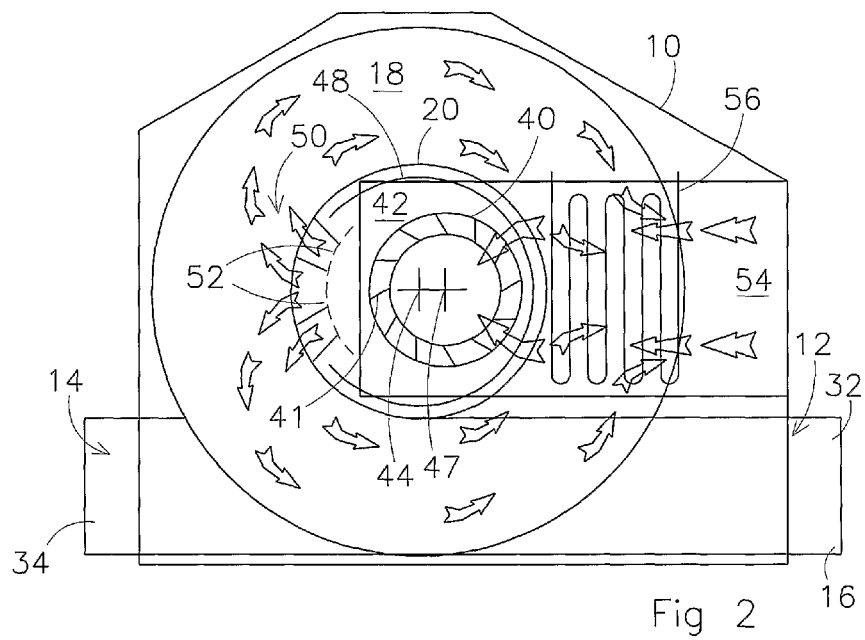
FIG. 2 shows a top view of the embodiment illustrated in FIG. 1.

FIGS. 1-2 diagrammatically illustrate an embodiment of a treatment device according to the first aspect of the invention as a spiral oven. In this embodiment, the treatment device comprises a housing which is denoted overall by reference numeral 10. The housing 10 is provided with an entry 12 for introducing the products to be treated and an exit 14 for discharging treated products. In the illustrated embodiment, a conveying means comprises an endless conveyor belt 16 which is arranged in the treatment space 18 delimited by the housing 10. This conveying means is advanced by slip friction through a hollow cylindrical drum 20 which is driven by a motor (not illustrated). The endless conveyor belt 16 can be moved over a helical conveying path 26 with a number of windings, which are arranged one above the other, around the drum 20, which conveying path 26 comprises straight sections 32, 34 at the bottommost and uppermost windings, denoted by reference numerals 28 and 30, respectively. These straight path sections extend through the entry 12 and exit 14, respectively. In the illustrated embodiment, air circulating means 40, in this case the fan of a ventilator, are disposed in the internal space 42 delimited by the drum 20 at a position which is eccentric with respect to the vertical rotary shaft 44 of the drum 20. The motor 46 of the ventilator 40 with rotary shaft 47 is arranged underneath the bottom 22 of the housing 10. A cylindrical body 48 with a vertical outflow aperture 50 is positioned between the air-circulation means 40 and the drum 20. In this outflow aperture, drum air-guiding means 52 are provided which are shown in more detail in FIG. 3. Air which has been brought to the desired treatment conditions with respect to temperature and moisture content by means of air-conditioning means 56, such as a heat exchanger, which are arranged in a conduit 54 is sucked in by the air-circulation means 40. Subsequently, this air flows via the drum space 42 over the products (not shown) which are situated on the conveyor belt 16 to the outflow aperture 50 with the drum air-guiding means 52.

Figure 3:
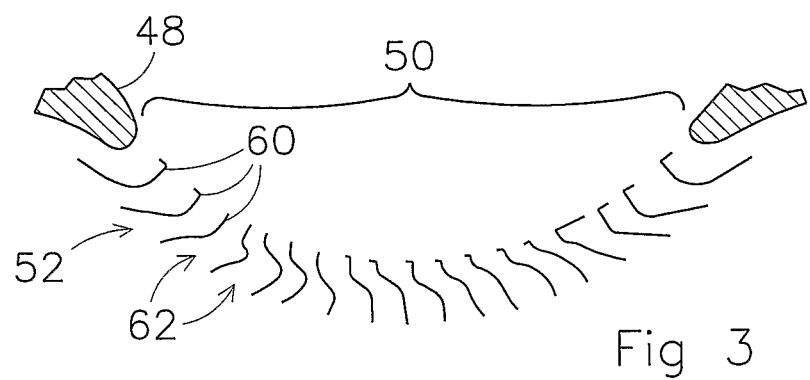
FIG. 3 shows a detail of an embodiment of a treatment device according to the invention.

In the embodiment illustrated in FIG. 3, the drum air-guiding means 52, comprise a number of spaced-apart baffle profiles 60 which run parallel to one another and are distributed over the outflow aperture 50 of the cylindrical body 48. These baffle profiles define conduits 62, which in this case each have their own unique shape. The conduits 62 extend over the height of the windings of the conveying path 26. As indicated by arrows in the top view from FIG. 2, the air flows in cocurrent and countercurrent over the products with respect to the direction of movement of the conveyor belt 16. Diametrically opposite the outflow apertures 50, the air is collected on the outer circumference of the endless conveyor belt 16 and directed into conduit 54. As is indicated by the size of the arrows, the air flow velocity and thus the amount of heat supplied to the products remains virtually constant throughout the entire oven space.

Figure 6:
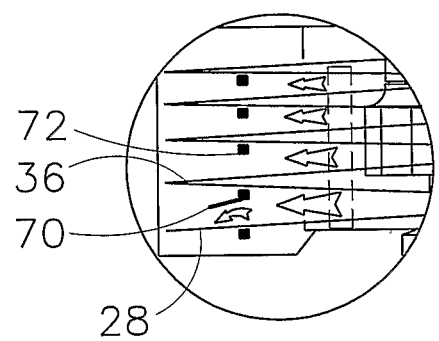
FIG. 6 shows a further detail of this embodiment.
Figure 5:
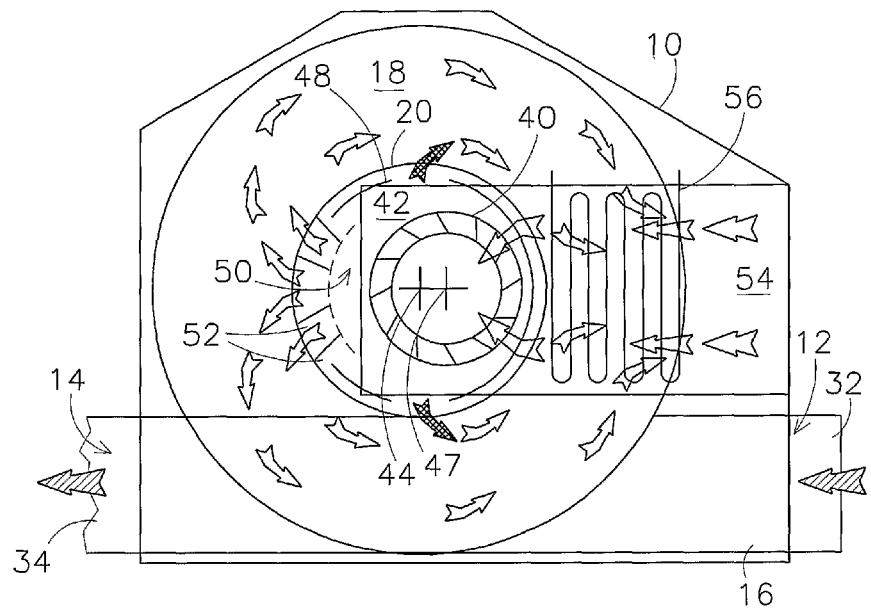
FIG. 5 shows a top view of the embodiment illustrated in FIG. 4.
Figure 4:
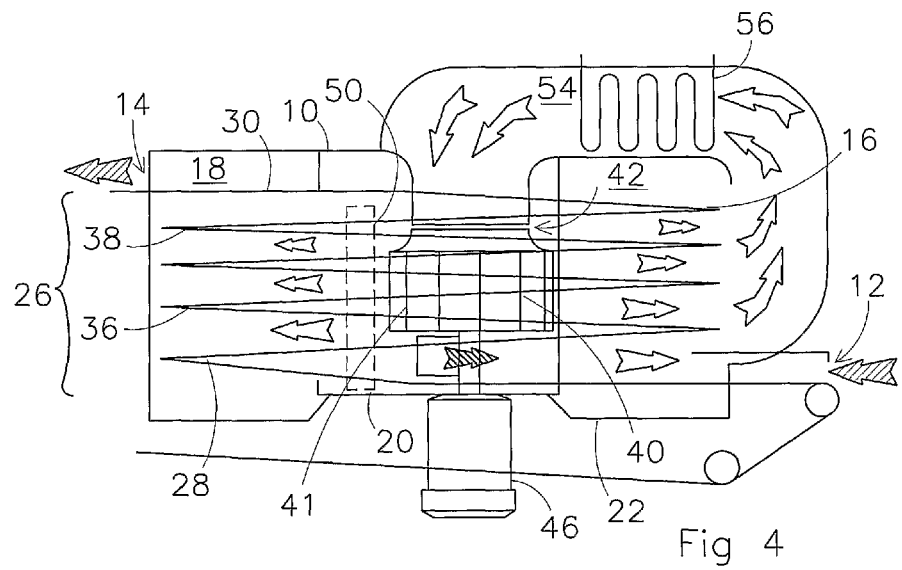
FIG. 4 shows a diagrammatic cross section of an embodiment of a spiral oven according to the second aspect of the invention.

FIGS. 4-6 diagrammatically show an embodiment of an oven according to the second aspect of the invention. Identical parts are denoted by the same reference numerals as in FIGS. 1-3. In this embodiment, the oven comprises a housing which is denoted overall by reference numeral 10. The housing 10 is provided with an entry 12 for introducing products to be treated and an exit 14 for discharging treated products. In the illustrated embodiment, a conveying means comprises an endless conveyor belt 16, the return part of which is partially shown, and is arranged in the oven space 18 delimited by the housing 10. This conveying means is advanced by slip friction through a hollow cylindrical drum 20 which is driven by a motor (not shown) which is disposed underneath the bottom 22 of the housing 10. The endless conveyor belt 16 can be moved over a helical conveying path 26 with several windings around the drum 20, which conveying path 26 comprises straight sections 32, 34 at the bottommost and uppermost windings, denoted by reference numerals 28 and 30, respectively. These straight path sections extend through the entry 12 and exit 14, respectively. The vertical distance between winding 28 and the winding 36 situated above the latter is greater than the vertical distance between the uppermost winding 30 and the winding 38 situated below the latter. In the illustrated embodiment, air-circulating means 40, in this case the fan of a ventilator, are disposed in the internal space 42 delimited by the drum 20 at a position which is eccentric with respect to the vertical rotary shaft 44 of the drum 20. The motor 46 which has a rotary shaft 47 is arranged underneath the bottom 22. Air which has been brought to the desired oven conditions with respect to temperature and moisture content by means of air-conditioning means 56, such as a heat exchanger, which are arranged in a conduit 54 is sucked in by the air-circulation means 40. Subsequently, this air flows via a tubular screen 48 arranged in the drum space 42 out of a vertical outflow aperture 50 of said screen over the products which are situated on the conveyor belt 16. Drum air-guiding means 52, such as the baffle profile 60 delimiting conduits 62 which extend over the height of the windings of the conveying path 26, are arranged in this outflow aperture 50. As indicated by arrows in the top view from FIG. 2, the air flows in cocurrent and countercurrent over the products with respect to the direction of movement of the conveyor belt 16. Diametrically opposite the outflow apertures 50, the air is collected on the outer circumference of the endless conveyor belt 16 and directed into conduit 54. Due to the greater pitch of the bottommost winding 28 with respect to the other windings of the conveying path 26, a relatively large amount of air (indicated diagrammatically by the size of the arrows) flows over this winding and the products situated thereon, the conditions of which air, such as temperature, moisture content and speed do not differ substantially from the conditions of the air which flows over the in this case downstream windings.

As is evident from FIG. 3, guiding means 70, such as a radially downwardly directed inclined plate may be provided on supports 72 of a winding 36 situated above the latter in order to direct the air flowing out in the radial direction towards the products situated on the bottommost winding 28. These guiding means 70 may form an integral part of said supports 72.

The invention claimed is:

1. A treatment device for treating food products with conditioned air, the treatment device comprising:
   a housing comprising a treatment space for treating the food products with the conditioned air, an entry for introducing the food products to be treated into the treatment space, and an exit for discharging treated food products from the treatment space,
   a cylindrical hollow drum that is composed of essentially horizontal and vertical strips allowing air flow inbetween the strips, being arranged in the treatment space of the housing, the drum delimiting an interior drum space, and the drum being rotatable about a vertical drum rotary axis,
   a drum drive for rotating the drum,
   a conveyor belt for supporting the food products, the conveyor belt extending through the treatment space so as to convey the food products supported on the conveyor belt from the entry through the treatment space to the exit, the conveyor belt comprising a plurality of windings which are situated one above the other so as to define a helical conveying path, and the windings of the conveyor belt extending around the drum in such a manner that the conveyor belt is in slip friction engagement with the drum,
   air-conditioning means being arranged in a conduit for conditioning the air flowing in the conduit, the conduit having a conduit entry in fluid communication with the treatment space and having a conduit exit in fluid communication with air-circulation means, and
   air-circulation means for circulating the air through a circulating flow path, the air-circulation means comprising a fan having a suction side and a discharge side, the fan being arranged on a rotary shaft in the interior drum space, the rotary shaft of the fan being arranged eccentrically to the drum rotary axis, the suction side being connected to the conduit exit, and the discharge side directing the air into the interior drum space,
   wherein in operation air flows from the conduit where the air is conditioned by the air-conditioning means, via the conduit exit into the interior drum space by suction by the air-conditioning means, and from the interior drum space via the drum over the windings of the conveyor belt carrying food products to be treated to the treatment space, and further into the conduit entry.

2. The treatment device according to claim 1, wherein drum air-guiding means are provided in the interior drum space at a position downstream of the fan.

3. The treatment device according to claim 2, wherein the drum air-guiding means are designed to distribute the conditioned air over a part of the circumference of the windings of the conveyor belt.

4. The treatment device according to claim 3, wherein the drum air-guiding means are arranged in such a manner that, during operation, the conditioned air flows from the part of the circumference of the windings over the conveyor belt in cocurrent and countercurrent with respect to the direction of movement of the conveyor belt.

5. The treatment device according to claim 2, wherein the drum air-guiding means comprise a tubular body which is arranged in the interior drum space, wherein the tubular body comprises a radial outflow aperture which extends circumferentially along only a part of the circumference of the drum.

6. The treatment device according to claim 5, wherein the baffle profiles are arranged in the outflow aperture of the tubular body.

7. The treatment device according to claim 5, wherein the outflow aperture of the tubular body is arranged diametrically opposite the fan.

8. The treatment device according to claim 7, wherein the fan rotary shaft is arranged with respect to the drum rotary axis in such a manner that the horizontal distance between the fan rotary shaft and the outflow aperture is greater than the horizontal distance between the drum rotary axis and the outflow aperture.

9. The treatment device according to claim 2, wherein the drum air-guiding means comprise a series of parallel spaced-apart vertically arranged baffle profiles which delimit vertically extending conduits.

10. The treatment device according to claim 9, wherein the baffle profiles are arranged in the outflow aperture of the tubular body.

11. The treatment device according to claim 1, wherein the air-circulation means comprises a fan drive for driving the fan, the fan drive being arranged outside the housing.

12. The treatment device according to claim 11, wherein the fan drive is arranged underneath a bottom of the housing.

13. The treatment device according to claim 1, wherein at least one winding of the conveying path near the entry has a pitch which is different to the pitch of downstream windings of the conveying path.

14. The treatment device according to claim 13, wherein the at least one winding near the entry has a pitch which is greater than that of the downstream windings of the conveying path.

15. The treatment device according to claim 1, wherein belt air-guiding means are provided for guiding conditioned air which are arranged in the space above the at least one winding.

16. The treatment device according to claim 15, wherein the belt air-guiding means are fitted to supporting means for supporting a downstream winding of the conveying path.

17. A treatment device for treating food products with conditioned air, the treatment device comprising:
   a housing comprising a treatment space for treating the food products with the conditioned air, an entry for introducing the food products to be treated into the treatment space, and an exit for discharging treated food products from the treatment space, a conveyor means for supporting the food products, the conveyor means extending through the treatment space so as to convey the food products supported on the conveyor means from the entry through the treatment space to the exit, the conveyor means comprising a plurality of windings which are situated one above the other so as to define a helical conveying path, the inner circumference of the plurality of windings having a central axis and defining an interior space, a drive for driving the conveyor means, air-guiding means comprising a tubular body which is arranged at the inner circumference of the plurality of windings, wherein the tubular body comprises a radial outflow aperture which extends circumferentially along only a part of the inner circumference of the plurality of windings, wherein a series of parallel spaced-apart vertically arranged baffle profiles which delimit vertically extending conduits, is arranged in the outflow aperture of the tubular body, air-conditioning means being arranged in a conduit for conditioning the air flowing in the conduit, the conduit having a conduit entry in fluid communication with the treatment space and having a conduit exit in fluid communication with air-circulation means, and air-circulation means for circulating the air through a circulating flow path, the air-circulation means comprising a fan having a suction side and a discharge side, the fan being arranged on a rotary shaft within the interior space defined by the inner circumference of the plurality of windings, the rotary shaft of the fan being arranged eccentrically to the central axis of the plurality of windings, the suction side being connected to the conduit exit, and the discharge side directing the air into tubular body, wherein in operation air flows from the conduit where the air is conditioned by the air-conditioning means, via the conduit exit into tubular body by suction by the air-conditioning means, and from the tubular body over the plurality of windings of the conveyor means carrying food products to be treated to the treatment space, and further into the conduit entry.

18. The treatment device according to claim 17, wherein the air-guiding means are arranged in such a manner that, during operation, the conditioned air flows from the outflow aperture of the tubular body over the conveyor belt in cocurrent and countercurrent with respect to the direction of movement of the conveyor belt.

19. The treatment device according to claim 17, wherein the outflow aperture of the tubular body is arranged diametrically opposite the fan.

20. The treatment device according to claim 19, wherein the fan rotary axis shaft is arranged with respect to the central axis of the plurality of windings in such a manner that the horizontal distance between the fan rotary axis shaft and the outflow aperture is greater than the horizontal distance between the central axis of the plurality of windings and the outflow aperture.

* * * * *